(12) United States Patent
Chappell et al.

(10) Patent No.: US 6,533,381 B1
(45) Date of Patent: Mar. 18, 2003

(54) VARIABLE RATE INK JET ENDORSER

(76) Inventors: William Donald Chappell, 825 N. Dorchester, Royal Oak, MI (US) 48067; Philip D. Klug, 448 Filbert St., Westland, MI (US) 48186; Christopher St. John, 11548 Morgan Ave., Plymouth, MI (US) 48170

( * ) Notice: Subject to any disclaimer, the term of this patent is extended or adjusted under 35 U.S.C. 154(b) by 0 days.

(21) Appl. No.: 09/429,946

(22) Filed: Oct. 29, 1999

(51) Int. Cl.[7] .............................................. B41B 29/393
(52) U.S. Cl. ....................................................... 347/14
(58) Field of Search ........................... 347/14; 358/1.16, 358/1.8

(56) References Cited

U.S. PATENT DOCUMENTS 5,300,968 A * 4/1994 Hawkins ...................... 347/12
5,493,684 A * 2/1996 Gephardt et al. ............ 713/322
5,619,622 A * 4/1997 Audi et al. ................... 358/1.8
5,838,888 A * 11/1998 Oda .......................... 358/1.16

* cited by examiner

Primary Examiner—Anh T. N. Vo

(57) ABSTRACT

A method and system for ink jet printing of characters in a variable rate document transport creates a correct column pitch for the document speed. An endorser control system includes a processor having a DMA unit for retrieving column data at a column data rate wherein the processor controls the variable document travel rate. The system further includes a sequencer for converting the column data into dot data. The DMA unit in conjunction with a compare match timer writes the column data from the processor memory to the sequencer at the specified column data rate.

6 Claims, 3 Drawing Sheets

VARIABLE RATE INK JET ENDORSER

BACKGROUND OF THE INVENTION

1. Field of the Invention

The invention relates to variable rate ink jet printing. More specifically, the invention concerns the use of a compare match timer and direct memory access to transmit column data from memory to an ink jet firing circuit at a rate that creates a correct column pitch for any document speed.

2. Background Art

Banks, credit unions and other financial institutions often image checks, deposit slips and other types of bank documents in order to process financial transactions efficiently. Document processing systems have therefore become quite prevalent in the industry. A typical document processing system also uses an ink jet endorser for checks and other banking documents. To produce dot matrix style text on a paper document traveling through a document processor, a fixed ink jet head is used. As the paper travels past the head's position, dots are fired in the proper sequence to form characters. Thus, it is desirable to allow improved allocation of resources by efficient division of processing tasks.

Another concern is the fact that document processing systems often require the endorser to operate at a variable document travel rate. This mode of operation means that the rate at which documents travel through the system varies based on the particular circumstances. Variable rate printing has typically required a microprocessor to determine the correct column pitch for a given document travel rate. Both the determination of the correct pitch and the actual transfer of the column data occupies valuable processing time, reduces overall efficiency, and increases costs. Current systems fail to appreciate that a substantial portion of these activities can be effectively delegated. This failure to delegate routine timing functions to more appropriate resources translates into additional processing time and reduced system performance. It is therefore desirable to allow variable rate printing while freeing the host processor for other tasks and thereby eliminating the real-time burden of controlling the column and dot timing.

SUMMARY OF THE INVENTION

In a first aspect of the invention, an endorser control system comprises a processor having a DMA unit for retrieving column data at a column data rate wherein the processor controls the variable document travel rate. The system further comprises a sequencer for converting the column data into dot data. The DMA unit thus writes the column data from the processor memory to the sequencer at the specified column data rate. The control system further comprises a compare match timer for matching the column data rate to the variable document travel rate.

In a second aspect of the invention, a document endorser comprises a DMA-based control system for generating dot data and controlling a variable document travel rate, and a firing circuit having a nozzle array with at least one column of nozzles. The circuit provides the nozzle array with a signal converted from the dot data.

In a third aspect of the invention, a method for controlling a variable rate ink jet printer comprises the step of storing column data in a processor memory wherein the column data corresponds to the information to be printed. The method further comprises the steps of matching the column data rate to a variable document travel rate and directly accessing the column data and the processor memory at the column data rate. The method also includes the step of converting the column data into dot data.

BRIEF DESCRIPTION OF THE DRAWING

The invention is set forth in exemplary fashion by the following detailed description of a preferred embodiment taken in conjunction with the drawing, in which.

DETAILED DESCRIPTION

The invention uses a compare match timer and a direct memory access (DMA) unit to transmit column data from a processor memory to an ink jet firing circuit at a rate that creates a correct column pitch for the document speed. Generally, the use of DMA allows for the transfer of data from a computer memory to some other location, without the intervention of the central processing unit. In the present case, DMA provides a low cost way for the main document processor to produce a variable column printing rate while eliminating the real time burden of controlling the column and dot timing.

Within each column, the desired dots must be fired to produce the desired character shape. Data stored in the processor memory contains data for each column that must be fired to form a character. Consecutive memory locations contain the data for consecutive character columns. Each memory location contains a bit pattern which corresponds to a dot on the head being printed or not printed. This column data is written to a sequencer by a DMA unit as described above. Since the processor is also controlling the speed at which the document passes in front of the print head, it can easily determine the associated time interval needed for properly printing each column.

Figure 1:
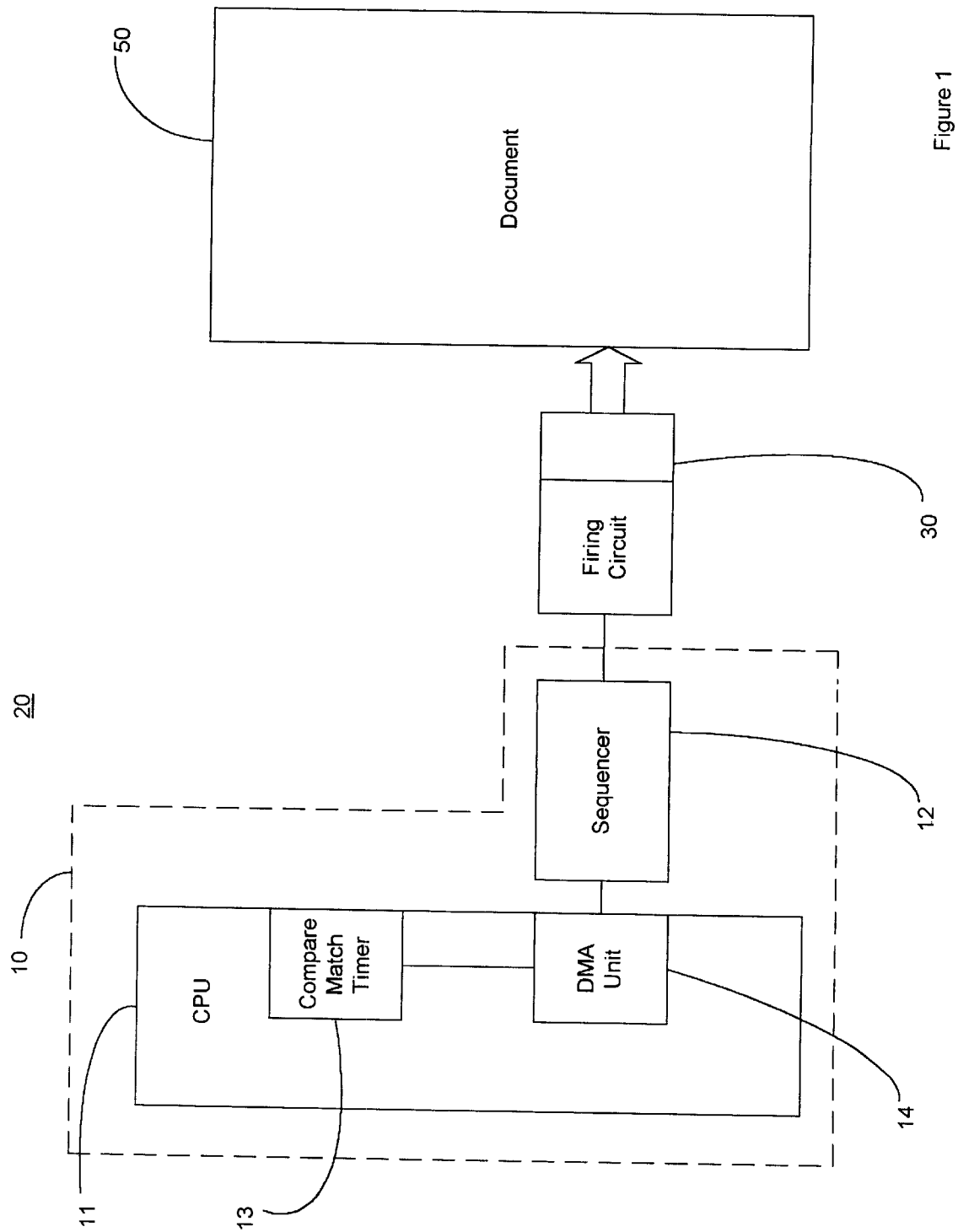
FIG. 1 is a block diagram of an endorser control system in accordance with the principles of the invention.

Specifically, FIG. 1 indicates the preferred embodiment of the invention as implemented in a variable rate ink jet endorser 20. The endorser 20 has a DMA-based control system 10, a firing circuit 30.

The control system 10 generally has a processor 11, a sequencer 12, and a compare match timer 13 with a travel rate input signal. The processor 11 has a DMA unit 14 for retrieving column data from the processor memory at the necessary column data rate. It is important to note that the processor 11 also controls the variable document travel rate. The DMA unit 14 writes the column data from the processor memory to the sequencer 12 at the column data rate required for the variable document travel rate. This critical timing feature is achieved by using the compare match timer 13 to match the column data rate to the variable document travel rate. The compare match timer 13 maintains a correct height to width ratio for all possible document travel rates. Thus, for a given document travel rate, the compare match timer 13 can adjust the rate at which the DMA unit 14 accesses and writes column data to the sequencer 12. The sequencer 12 converts the column data into dot data.

Figure 2:
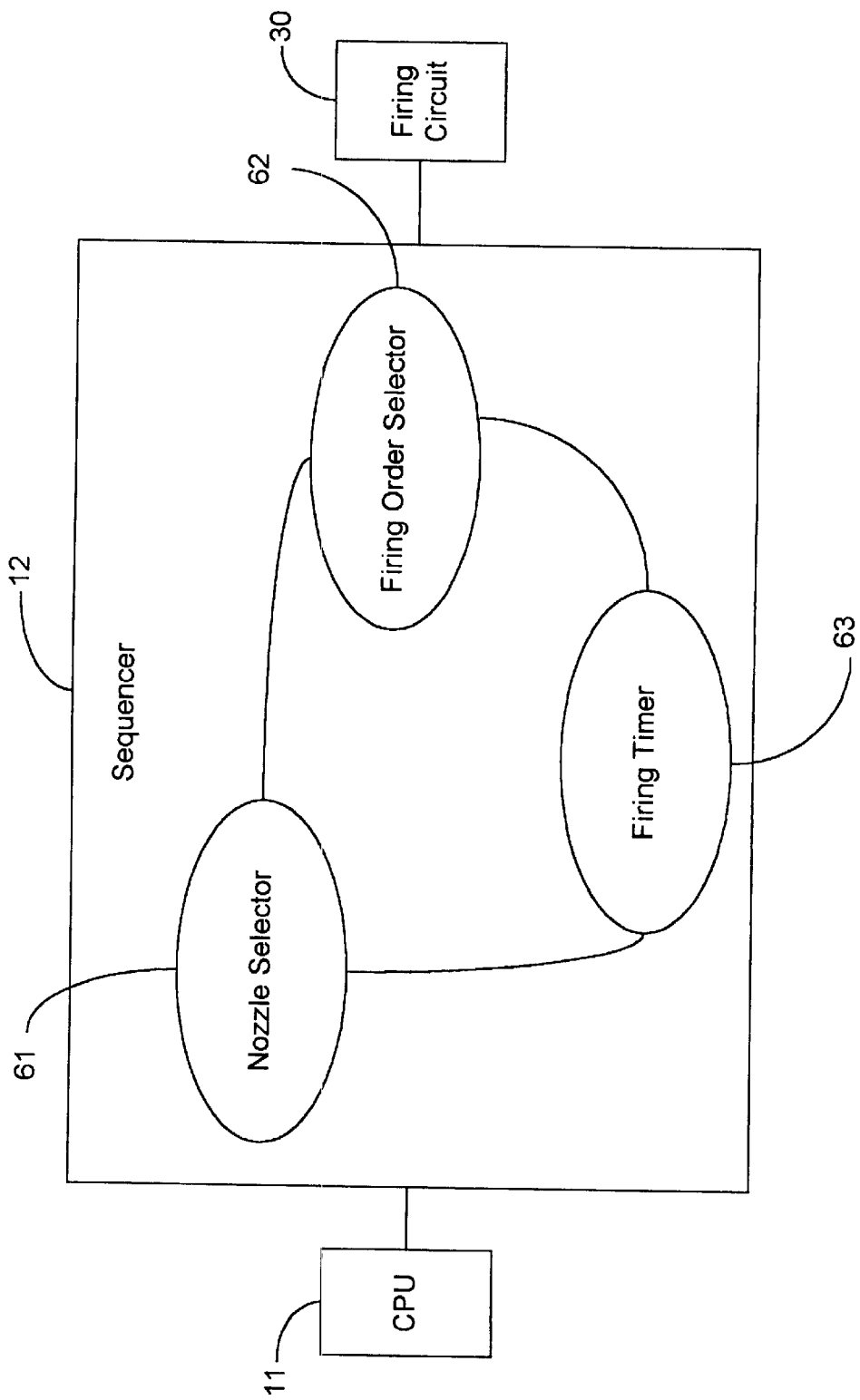
FIG. 2 is a block diagram of a sequencer in accordance with the principles of the invention.

As best seen in FIG. 2, the sequencer 12 preferably has a nozzle selector 61 for selecting nozzles to fire based on the binary pattern of the column data. The sequencer further includes a firing timer 63 for controlling the firing time of each selected nozzle. Furthermore, the sequencer 12 has a firing order selector 62 for determining a firing sequence of the selected nozzles. These parameters are tightly controlled to produce the optimum amount of ink while maintaining proper operating conditions to prevent damage or shortened head life.

The firing circuit 30 has a nozzle array with at least one column of nozzles, wherein the circuit 30 provides the nozzle array with a signal converted from the dot data. The endorser 20, therefore exposes a document 50 or other printing substrate to the nozzle array at the variable document rate. Each of these components can be readily implemented as firmware or other logic well known in the art. It will be appreciated that the present invention can be used in other variable rate ink jet printing environments such as label or industrial printing.

Figure 3:
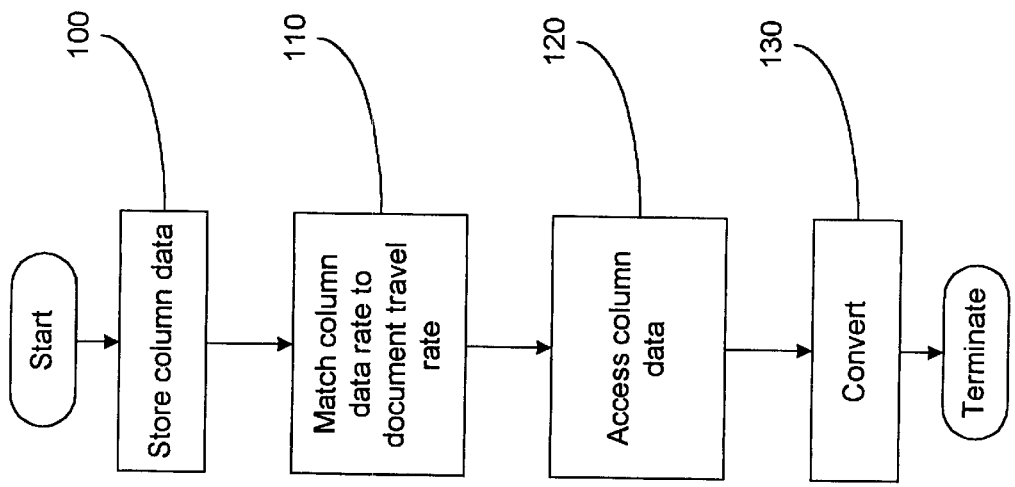
FIG. 3 is a flowchart of a method for controlling a variable rate ink jet printer.

FIG. 3 shows a flowchart of a computerized method for controlling a variable rate ink jet printer for programming purposes. In operation, the endorser stores column data in the processor memory at step 100, wherein the column data corresponds to information to be printed. This information can be received from any number of sources such as a network terminal, personal computer, or mainframe. The column data rate is then matched to a variable document travel rate at step 110 by the compare match timer. At step 120 it can be seen that this function enables the stored column data to be directly accessed from the processor memory at the necessary column data rate without placing and undue burden on processor 11. The column data is then converted at step 130 into dot data which is transferred to firing circuit 30 for application to the document 50.

The invention has been described with reference to a detailed description of a preferred embodiment for the sake of example only. The scope of the invention is to be determined by proper interpretation of the appended claims.

We claim:

1. An endorser control system comprising:
   a processor having a DMA unit for retrieving column data at a column data rate, said processor controlling a variable document travel rate;
   said processor further including a compare match timer operatively coupled to the DMA unit for matching said column data rate to said variable document travel rate; and
   a sequencer operatively coupled to the DMA unit for converting said column data into dot data, said DMA unit writing said column data from a processor memory to said sequencer at said column data rate.

2. The system of claim 1 wherein said compare match timer maintains a correct height to width ratio for possible document travel rates.

3. The system of claim 1 wherein said sequencer comprises:
   a nozzle selector for selecting nozzles to fire based on a binary pattern of said column data;
   a firing timer for controlling the firing time of each selected nozzle; and
   a firing order selector for determining a firing sequence of said selected nozzles.

4. A document endorser comprising:
   a processor for controlling a variable document travel rate, said processor including:
      a DMA unit for retrieving column data from a processor memory at a column data rate; and,
      a compare match timer operatively couple to the DMA unit for matching said column data rate to said variable document travel rate;
   a sequencer operatively coupled to the DMA unit for converting said column data into dot data, wherein said column data is written to said sequencer from said processor memory by said DMA unit; and,
   a firing circuit operatively coupled to the control system and having a nozzle array with at least one column of nozzles, said circuit providing said nozzle array with a signal converted from said dot data.

5. A method for controlling a variable rate ink jet printer comprising the steps of:
   storing column data in a processor memory, said column data corresponding to information to be printed;
   matching a column data rate to a variable document travel rate;
   directly accessing said column data in said processor memory at said column data rate with a first processing component; and
   converting said column data into dot data with a second processing component; and
   isolating the first processing component from the second processing component such that conversion of the column data is transparent to the first processing component.

6. The method of claim 5 further comprising the step of maintaining a correct height to width ratio for possible document travel rates.

* * * * *

UNITED STATES PATENT AND TRADEMARK OFFICE
CERTIFICATE OF CORRECTION

PATENT NO. : 6,533,381 B1
DATED : March 18, 2003
INVENTOR(S) : Chappell et al.

It is certified that error appears in the above-identified patent and that said Letters Patent is hereby corrected as shown below:

Title page,
Insert Item -- [73] Assignee:     Unisys Corporation, Blue Bell, PA --
Item [56], References Cited, U.S. PATENT DOCUMENTS, insert the following:
-- 3,911,818    10/14/75        Macllvaine
   5,828,387    10/27/98        Watanya et al.
   5,294,942    3/15/94         Lowenthal et al.
   4,026,401    5/31/77         Doane --
Insert Item -- [74] *Attorney, Agent, or Firm*—Law office of Harness, Dickey & Pierce, L.L.C., Lise A. Rode; Mark T. Starr --

Signed and Sealed this

Twelfth Day of July, 2005

JON W. DUDAS
*Director of the United States Patent and Trademark Office*